Feb. 21, 1950    J. H. GOODE    2,497,987
ADJUSTABLE CONNECTION FOR PIPES
Filed Sept. 10, 1948
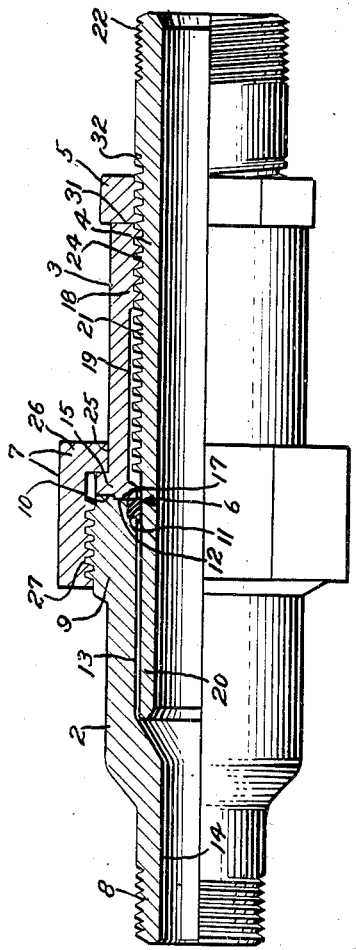
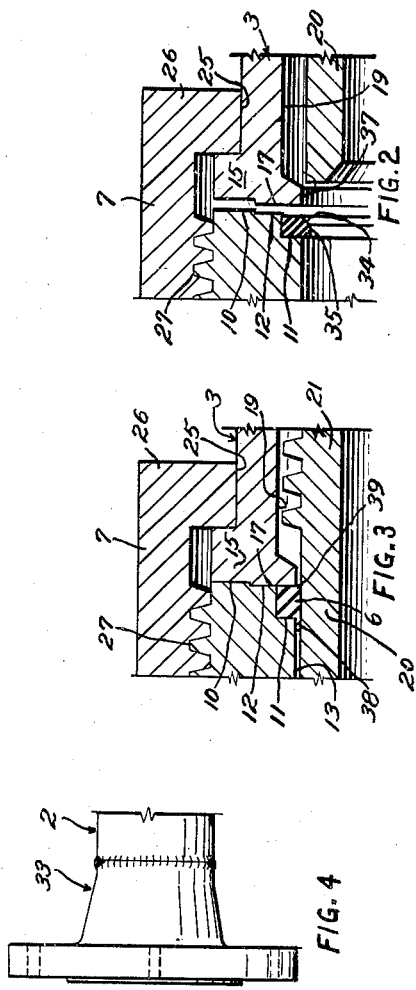
JOSEPH H. GOODE
INVENTOR.
BY Lester B. Clark
  Ray L. Smith
ATTORNEYS Patented Feb. 21, 1950

2,497,987

UNITED STATES PATENT OFFICE 2,497,987

ADJUSTABLE CONNECTION FOR PIPES

Joseph H. Goode, Houston, Tex.

Application September 10, 1948, Serial No. 48,592

6 Claims. (Cl. 285—122)

This invention relates to an adjustable connection or coupling for pipes and to methods of joining pipe sections.

It is an object of this invention to provide an adjustable connection between pipe sections, which connection may be made with ease and rapidity.

It is a further object of this invention to provide a connection of this class having a novel seal which may be deformed between connecting members to insure against leakage.

It is another object of this invention to provide a seal of this class of a size and configuration that when deformed between connecting members, a lip thereof is tightly confined between the members to insure against leakage.

It is a further object of this invention to provide a connection of this class which may be locked in position when adjusted to desired length.

It is still a further object of this invention to provide a protective sleeve to cover the contacting faces of the coupling members.

It is also an object of this invention to provide a connection between pipe sections which may be adjusted from time to time after installation to compensate for either compression or expansion in the length of the connected line.

It is a further object of this invention to provide methods for adjustably coupling pipe sections.

Other and further objects of this invention will be obvious when the specification is considered in connection with the drawings in which:

Fig. 1 is an elevation, part in section, showing the coupling in position to join two threaded pipe sections which are not shown;

Fig. 2 is an enlarged sectional detail showing the seal configuration before it has been deformed between the coupling members;

Fig. 3 is an enlarged sectional detail showing the seal after it has been deformed between the coupling members;

Fig. 4 shows a detail of a modification of the invention in which the coupling members terminate outwardly in flanged ends.

As shown in Fig. 1, the coupling 1 comprises a conduit or coupling member 2, a female coupling member 3, a connector or male coupling member 4, a lock nut 5, a seal 6, and a sleeve 7 or clamping means. These corresponding elements are also found in my co-pending application Serial No. 758,156, notice of allowance thereof having been mailed under date of June 29, 1949; but in such application the seal is located at a different point.

The coupling member 2 has an externally threaded end 8 and a larger flared and externally threaded opposite end 9. The face 10 of the flared end 9 has an inner counter bore or groove 11 and an outer counter bore 12 therein. The inner diameter 13 of the end 9 is substantially larger than the inner diameter 14 of the end 8.

The coupling member 3 has a flanged end 15 and the face thereof is turned down peripherally to form an upstanding face section 17 of just slightly smaller diameter than the outer counter bore 12 of the coupling member 2. The coupling member 3 has an internally threaded end 18 opposite the flanged end 15, and an internally enlarged section 19 of larger diameter than the roots of the threaded end 18.

The connector 4 has an externally turned down end portion 20, an externally threaded central section 21, and at the other end an externally threaded section 22 which is adapted for connection to a pipe section. The end portion 20 of the connector 4 is of a diameter to extend into the socket defined by the inner diameter 13 of the coupling member 2; the centrally threaded section 21 is of a diameter to fit within the internally enlarged portion 19 of the coupling member 3; and the threads 24 of this central section are engageable within the threaded connector end section 18.

The lock nut 5 is threaded internally for engagement with the threads 24 of the central section 21.

The protective sleeve or clamp 7 has a bore 25 through the closed end 26 thereof to slide over the coupling member 3 and this sleeve has an internally threaded open end 27 for engagement with the flared threaded end 9 of the coupling member 2.

The coupling shown in Fig. 1 is assembled as follows. The sleeve 7 is slid over the coupling member 3. The seal 6, of an axial width slightly less than the depth of the groove or counterbore 11, and of a slightly greater diameter than this groove, is placed thereinto. Then the sleeve 7 is threaded onto the coupling member 2 to bring the face 17 into abutment with the counter bore 12. Then the lock nut 5 is threaded full up on connector 4 as far as the end thread 32 of the central threaded section 21. After this the connector 4 is threaded into coupling member 3 until the connector end 20 passes by the seal 6 and deforms it into the configuration shown in Fig. 3.

In its normal configuration the seal consists of a tapered portion 34 and a cylindrical portion 35 which is of a lesser diameter than the outer diameter of the connector end 20. On the other hand the inner diameter of the seal at the beginning of the taper 34 is greater than the outer diameter of the connector end 20, but of lesser diameter than the inner diameter 37 of the flange 15.

When the connector is threaded into the coupling member 3 it first contacts the seal 6 at a point along the tapered portion 34 and when it moves by the seal, the seal is deformed so that the portion 38 is very tightly confined within the space between connector end 20 and coupling member 2, while the tapered portion is deformed into substantially the configuration 39. Such deformation of the seal results in a positive, leakproof connection between connector and coupling members.

Obviously the greater the pressure within the line from the direction of the coupling member 2, the greater will be the forces acting on the lip portion 38 tending to positively seal the line in the direction of these forces.

When the coupling shown in Fig. 1 has been assembled at a length to fit between two pipe sections terminating in collars, the end 8 may first be threaded into the collar of one pipe section at which time the whole coupling turns as a rigid unit. Then the sleeve 7 may be unthreaded from the flared end 9 so that the connector 4 with the coupling member 3, the lock nut 5, and the sleeve 7, moving along together therewith as a unit, may have its end 22 threaded into the collar of the other pipe section. Then the lock nut 5 may be loosened to permit the coupling member 3 to be threaded back into abutment with the coupling member 2, after which the sleeve 7 may be retightened on the flared end 9, and the lock nut 5 may again be tightened to lock together coupling member 3 and connector 4.

When in the course of usage a pipe line comprising pipe sections coupled together by a coupling 1 may become extended under tension forces, or shortened under compression forces, to undesired lengths, adjustments may be made in the following manner. The lock nut 5 may be turned to unlock coupling member 3 and connector 4. Also the sleeve 7 may be loosened on the flared end 9 so that the closed end 26 of the sleeve does not bind the flange 15 of the coupling member 3 against rotation. Then the coupling member 3 may be turned in a direction to cause the connector 4 to move without rotation in the direction to effect a desired adjustment. After this the sleeve 7 may again be tightened full upon the flared end 9 and the lock nut 5 tightened to lock the connector 4 and coupling member 3 together.

In cases where the end 22, in connection, has been threaded into a union, the pipe line may be either shortened or lengthened by first breaking the union, then loosening the sleeve and lock nut, then turning the coupling member 3 in a direction to cause the connector 4 to travel outwardly or inwardly as desired. Then when the desired adjustment of length has been made the union may be threaded up on the end 22 and the lock nut 5 may be retightened.

Although the ends 8 and 22 are shown externally threaded in Fig. 1, they may be altered in a modification of this invention and provided with internal threads. Likewise, these ends 8 and 22 may be left unthreaded and beveled in any well known manner for welding. Or as shown in Fig. 4, the end 8 and also the end 22, not shown, may have flanges 33 welded thereonto to be bolted to flanged pipe sections.

It is obvious that the construction of this invention which essentially varies from other couplings in providing a split coupling comprised of two coupling members connectable by a sleeve constitutes a decided advantage over other such structures in which the coupling element is not divided but is comprised of an integral unit. With this construction the seal 6 is obviously much more accessible for replacement in case of its deterioration, and the coupling has the other advantages of adjustment hereinabove described.

Broadly this invention relates to an easily adjustable coupling which obviates cutting pipe sections to exact lengths; which has therein a seal deformable to render the coupling leakproof and which seal is easily accessible for replacement in case of deterioration. This invention further broadly relates to an adjustable connection by which pipe lines may be shortened or lengthened as desired to compensate for variation in the length of the line.

I claim:

1. In a coupling, the combination of, a hollow, internally threaded, female member, a conduit member having a flow passage therein communicating with a socket of larger diameter terminating in an annularly grooved end, a deformable seal in said groove and extending inwardly therefrom, clamping means movable relative to said members for connecting said members in end face abutment adjacent said groove, and a hollow male member providing a flow passage of substantially conduit flow passage diameter having an externally threaded section for engagement with the internal threads of said female member and having a portion of an outer diameter to extend into said socket and to deform said seal into space between said portion and said socket.

2. In a coupling, the combination of, a hollow, internally threaded, female member, a conduit member having a flow passage therein communicating with a socket of larger diameter terminating in an annularly grooved end, a deformable seal in said groove and extending inwardly therefrom, clamping means movable relative to said members for connecting said members in end face abutment adjacent said groove, and a hollow male member providing a flow passage of substantially conduit flow passage diameter having an externally threaded section for engagement with the internal threads of said female member and having a portion of an outer diameter to extend into said socket and to deform said seal into space between said portion and said socket, said conduit and said male member both being externally threaded at their outer ends for engagement with pipe sections to be adjustably connected.

3. In a coupling, the combination of, a hollow, internally threaded, female member, a conduit member having a flow passage therein communicating with a socket of larger diameter terminating in an annularly grooved end, a deformable seal in said groove and extending inwardly therefrom, clamping means movable relative to said members for connecting said members in end face abutment adjacent said groove, and a hollow male member providing a flow passage of substantially conduit flow passage diameter having an externally threaded section for engagement with the internal threads of said female member and having a portion of an outer diameter to extend into said socket and to deform said seal into space between said portion and said socket, and means on said male member for locking said male member and said female member together.

4. In a coupling, the combination of, a hollow, internally threaded, female member, a conduit member having a flow passage therein communicating with a socket of larger diameter terminating in an annularly grooved end, a deformable seal in said groove and providing a portion inwardly thereof and tapered outwardly in the direction of said female member, clamping means movable relative to said members for connecting said members in end face abutment adjacent said groove, and a hollow male member providing a flow passage of substantially conduit flow passage diameter having an externally threaded section for engagement with the internal threads of said female member and having a portion of an outer diameter to extend into said socket and to deform said seal into space between said portion and said socket.

5. In a coupling, the combination of, a hollow, internally threaded, female member, a conduit member having a flow passage therein communicating with a socket of larger diameter terminating in an annularly grooved end, a deformable seal in said groove and extending inwardly therefrom, clamping means movable relative to said members for connecting said members in end face abutment adjacent said groove, and a hollow male member providing a flow passage of substantially conduit flow passage diameter having an externally threaded section for engagement with the internal threads of said female member and having a portion of an outer diameter to extend into said socket and to deform said seal into space between said portion and said socket, said conduit having a flanged outer end for connection to a flanged pipe section and said male member having an externally threaded outer end for connection to a threaded pipe section so that said sections may be adjustably connected.

6. In a coupling, the combination of, a hollow, internally threaded, female member, a conduit member having a flow passage therein communicating with a socket of larger diameter terminating in an annularly grooved end, a deformable seal in said groove and extending inwardly therefrom, clamping means movable relative to said members for connecting said members in end face abutment adjacent said groove, and a hollow male member providing a flow passage of substantially conduit flow passage diameter having an externally threaded section for engagement with the internal threads of said female member and having a portion of an outer diameter to extend into said socket and to deform said seal into space between said portion and said socket, said conduit and said male member being adapted at their outer ends for engagement with pipe sections to be adjustably connected.

JOSEPH H. GOODE.

REFERENCES CITED

The following references are of record in the file of this patent:

UNITED STATES PATENTS

| Number | Name | Date |
| --- | --- | --- |
| 347,060 | Rankin | Aug. 10, 1886 |
| 1,043,364 | Schuermann | Nov. 5, 1912 |
| 1,495,011 | Ford | May 20, 1924 |
| 1,590,357 | Feisthamel | June 29, 1926 |
| 1,903,392 | Crowley | Apr. 4, 1933 |
| 2,209,181 | Wendel | July 23, 1940 |
| 2,449,588 | Clafford | Sept. 21, 1948 |